(12) United States Patent
Alatorre et al.

(10) Patent No.: US 8,918,439 B2
(45) Date of Patent: Dec. 23, 2014

(54) DATA LIFECYCLE MANAGEMENT WITHIN A CLOUD COMPUTING ENVIRONMENT

(75) Inventors: Gabriel Alatorre, Long Beach, CA (US); Richard Ayala, Medford, NJ (US); Kavita Chavda, Roswell, GA (US); Sandeep Gopisetty, Morgan Hill, GA (US); Aameek Singh, University Place, WA (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 12/817,245

(22) Filed: Jun. 17, 2010

(65) Prior Publication Data

US 2011/0314069 A1    Dec. 22, 2011

(51) Int. Cl.
| G06F 12/00 | (2006.01) |
|---|---|
| G06F 7/00 | (2006.01) |
| G06F 17/00 | (2006.01) |
| G06F 17/30 | (2006.01) |
| G06F 15/173 | (2006.01) |
| G06F 9/455 | (2006.01) |

(52) U.S. Cl.
CPC .................. G06F 17/30082 (2013.01)
USPC ........... 707/827; 707/609; 707/695; 707/722; 707/802; 709/223; 709/226; 718/1

(58) Field of Classification Search
CPC ................ G06F 3/067; G06F 11/3034; G06F 17/30194; G06F 17/30197; G06F 17/30283; G06F 17/30566; G06F 17/30575
USPC .............. 707/609, 695, 722, 802, 827; 718/1; 709/223, 226
See application file for complete search history.

(56) References Cited

U.S. PATENT DOCUMENTS

| 6,839,803 | B1 | 1/2005 | Loh et al. | |
|---|---|---|---|---|
| 7,636,764 | B1 | 12/2009 | Fein et al. | |
| 2005/0076293 | A1 | 4/2005 | Beresnevichiene | |
| 2007/0156774 | A1 | 7/2007 | Gomes | |
| 2007/0208788 | A1 | 9/2007 | Chakravarty et al. | |
| 2007/0299959 | A1 | 12/2007 | Penny et al. | |
| 2008/0104501 | A1 | 5/2008 | Sattler et al. | |
| 2010/0088150 | A1 | 4/2010 | Mazhar et al. | |
| 2010/0262466 | A1* | 10/2010 | Smith et al. | ............ 705/10 |
| 2010/0333116 | A1* | 12/2010 | Prahlad et al. | ............ 719/328 |
| 2012/0173822 | A1* | 7/2012 | Testardi et al. | ............ 711/135 |

OTHER PUBLICATIONS

Mell et al., "The NIST Definition of Cloud Computing", National Institute of Standards and Technology, Information Technology Laboratory, Version 15, Oct. 7, 2009, 2 pages.

* cited by examiner

*Primary Examiner* — Augustine K Obisesan
*Assistant Examiner* — Berhanu Mitiku
(74) *Attorney, Agent, or Firm* — William E. Schiesser; Keohane & D'Alessandro, PLLC

(57) ABSTRACT

Embodiments of the present invention provide lifecycle storage management for data within a Cloud computing environment. Specifically, a set of policies can be defined that allow for automatic valuation of the data and migration of the data between a set of storage tiers. Before a policy set is deployed, it can be assessed to determine effects it will have on cost, performance, and data location. Based on data characteristics and access patterns, a set of policy recommendations can be provided that predict the value of the data over time, and offer an improved migration strategy for moving the data between the set of storage tiers as the value of the data changes.

19 Claims, 8 Drawing Sheets

DATA LIFECYCLE MANAGEMENT WITHIN A CLOUD COMPUTING ENVIRONMENT

FIELD OF THE INVENTION

The present invention generally relates to Cloud computing. Specifically, the present invention relates to data lifecycle management within a Cloud computing environment.

BACKGROUND

The Cloud computing environment is an enhancement to the predecessor grid environment, whereby multiple grids and other computation resources may be further abstracted by a Cloud layer, thus making disparate devices appear to an end-user as a single pool of seamless resources. These resources may include such things as physical or logical compute engines, servers and devices, device memory, storage devices, networks, business applications and other software, and the like. As Cloud computing continues to evolve, effective storage management becomes increasingly important.

SUMMARY

Embodiments of the present invention provide lifecycle storage management for data within a Cloud computing environment. Specifically, a set of policies can be defined that allow for automatic valuation of the data and migration of the data between a set of storage tiers. Before a policy set is deployed, it can be assessed to determine effects it will have on cost, performance, and data location. Based on data characteristics and access patterns, a set of policy recommendations can be provided that predict the value of the data over time, and offer an improved migration strategy for moving the data between the set of storage tiers as the value of the data changes.

A first aspect of the present invention provides a method for managing data storage within a Cloud computing environment, comprising: accessing a set of policies for managing storage of data, the set of policies automating valuation of the data and migration of the data between a set of storage tiers within the Cloud computing environment; assessing the set of policies to determine effects of implementing the set of policies; and providing a set of recommendations based on implementation of the set of policies, the set of recommendations predicting a value of the data as well as a migration strategy for moving the data between the set of storage tiers over time as the value of the data changes.

A second aspect of the present invention provides a system for managing data storage within a Cloud computing environment, comprising: a bus; a processor coupled to the bus; and a memory medium coupled to the bus, the memory medium comprising instructions to: access a set of policies for managing storage of data, the set of policies automating valuation of the data and migration of the data between a set of storage tiers within the Cloud computing environment; assess the set of policies to determine effects of implementing the set of policies; and provide a set of recommendations based on implementation of the set of policies, the set of recommendations predicting a value of the data as well as a migration strategy for moving the data between the set of storage tiers over time as the value of the data changes.

A computer program product for managing data storage within a Cloud computing environment, the computer program product comprising a computer readable storage media, and program instructions stored on the computer readable storage media, to: access a set of policies for managing storage of data, the set of policies automating valuation of the data and migration of the data between a set of storage tiers within the Cloud computing environment; assess the set of policies to determine effects of implementing the set of policies; and provide a set of recommendations based on implementation of the set of policies, the set of recommendations predicting a value of the data as well as a migration strategy for moving the data between the set of storage tiers over time as the value of the data changes.

A fourth aspect of the present invention provides a method for deploying a system for managing data storage within a Cloud computing environment, comprising: providing a computer infrastructure having functionality to: access a set of policies for managing storage of data, the set of policies automating valuation of the data and migration of the data between a set of storage tiers within the Cloud computing environment; assess the set of policies to determine effects of implementing the set of policies; and provide a set of recommendations based on implementation of the set of policies, the set of recommendations predicting a value of the data, as well as a migration strategy for moving the data between the set of storage tiers over time as the value of the data changes.

BRIEF DESCRIPTION OF THE DRAWINGS

These and other features of this invention will be more readily understood from the following detailed description of the various aspects of the invention taken in conjunction with the accompanying drawings in which.

Figure 1:
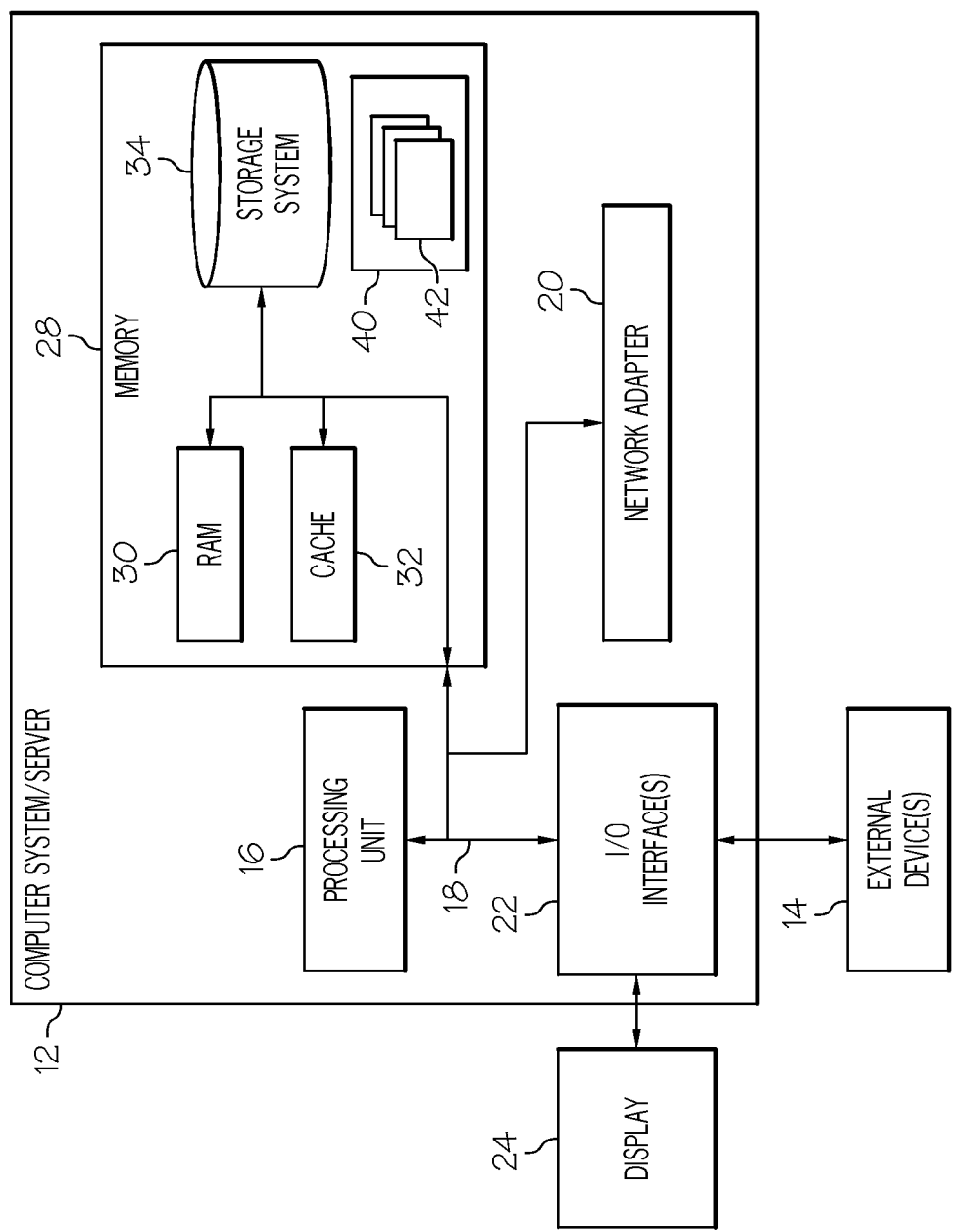
FIG. 1 depicts a Cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

For convenience, the detailed description has the following sections:

I. Cloud Computing Definitions

II. Detailed Implementation of Embodiments of the Invention

I. Cloud Computing Definitions

The following definitions have been derived from the "Draft NIST Working Definition of Cloud Computing" by Peter Mell and Tim Grance, dated Oct. 7, 2009, which is cited on an IDS filed herewith, and a copy of which is attached thereto.

Cloud computing is a model for enabling convenient, on-demand network access to a shared pool of configurable computing resources (e.g., networks, servers, storage, applications, and services) that can be rapidly provisioned and released with minimal management effort or service provider interaction. This Cloud model promotes availability and is comprised of at least five characteristics, at least three service models, and at least four deployment models.

Characteristics are as Follows:

On-demand self-service: A consumer can unilaterally provision computing capabilities, such as server time and network storage, as needed, automatically without requiring human interaction with each service's provider.

Broad network access: Capabilities are available over a network and accessed through standard mechanisms that promote use by heterogeneous thin or thick client platforms (e.g., mobile phones, laptops, and PDAs).

Resource pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state, or datacenter). Examples of resources include storage, processing, memory, network bandwidth, and virtual machines.

Rapid elasticity: Capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: Cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Cloud Software as a Service (SaaS): The capability provided to the consumer is to use the provider's applications running on a Cloud infrastructure. The applications are accessible from various client devices through a thin client interface such as a web browser (e.g., web-based email). The consumer does not manage or control the underlying Cloud infrastructure including network, servers, operating systems, storage, or even individual application capabilities, with the possible exception of limited user-specific application configuration settings.

Cloud Platform as a Service (PaaS): The capability provided to the consumer is to deploy onto the Cloud infrastructure consumer-created or acquired applications created using programming languages and tools supported by the provider. The consumer does not manage or control the underlying Cloud infrastructure including networks, servers, operating systems, or storage, but has control over the deployed applications and possibly application-hosting environment configurations.

Cloud Infrastructure as a Service (IaaS): The capability provided to the consumer is to provision processing, storage, networks, and other fundamental computing resources where the consumer is able to deploy and run arbitrary software, which can include operating systems and applications. The consumer does not manage or control the underlying Cloud infrastructure but has control over operating systems, storage, deployed applications, and possibly limited control of select networking components (e.g., host firewalls).

Deployment Models are as Follows:

Private cloud: The Cloud infrastructure is operated solely for an organization. It may be managed by the organization or a third party and may exist on-premises or off-premises.

Community cloud: The Cloud infrastructure is shared by several organizations and supports a specific community that has shared concerns (e.g., mission, security requirements, policy, and compliance considerations). It may be managed by the organizations or a third party and may exist on-premises or off-premises.

Public cloud: The Cloud infrastructure is made available to the general public or a large industry group and is owned by an organization selling Cloud services.

Hybrid cloud: The Cloud infrastructure is a composition of two or more clouds (private, community, or public) that remain unique entities but are bound together by standardized or proprietary technology that enables data and application portability (e.g., Cloud bursting for load-balancing between clouds).

A Cloud computing environment is service oriented with a focus on statelessness, low coupling, modularity, and semantic interoperability.

II. Detailed Implementation of Embodiments of the Invention

Embodiments of the present invention provide lifecycle storage management for data within a Cloud computing environment. Specifically, a set of policies can be defined that allow for automatic valuation of the data and migration of the data between a set of storage tiers. Before a policy set is deployed, it can be assessed to determine effects it will have on cost, performance, and data location. Based on data characteristics and access patterns, a set of policy recommendations can be provided that predict the value of the data over time, and offer an improved migration strategy for moving the data between the set of storage tiers as the value of the data changes.

Referring now to FIG. 1, a schematic of an exemplary Cloud computing node is shown. Cloud computing node 10 is only one example of a suitable Cloud computing node and is not intended to suggest any limitation as to the scope of use or functionality of the invention described herein. Regardless, Cloud computing node 10 is capable of being implemented and/or performing any of the functions set forth in Section I above.

In Cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed Cloud computing environments that include any of the above systems or devices, and the like.

Computer system/server 12 may be described in the general context of computer system-executable instructions, such as program modules, being executed by a computer system. Generally, program modules include routines, programs, objects, components, logic, data structures, and so on, that perform particular tasks or implement particular abstract data types. The exemplary computer system/server 12 may be practiced in distributed Cloud computing environments where tasks are performed by remote processing devices that are linked through a communications network. In a distributed Cloud computing environment, program modules may be located in both local and remote computer system storage media including memory storage devices.

As shown in FIG. 1, computer system/server 12 in Cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media and removable and non-removable media.

System memory 28 can include computer system readable media in the form of volatile memory, such as random access memory (RAM) 30 and/or cache memory 32. Computer system/server 12 may further include other removable/non-removable and volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of the invention.

The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

A computer readable signal medium may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules and program data, or some combination thereof, may include an implementation of a networking environment. Program modules 42 generally carry out the functions and/or methodologies of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
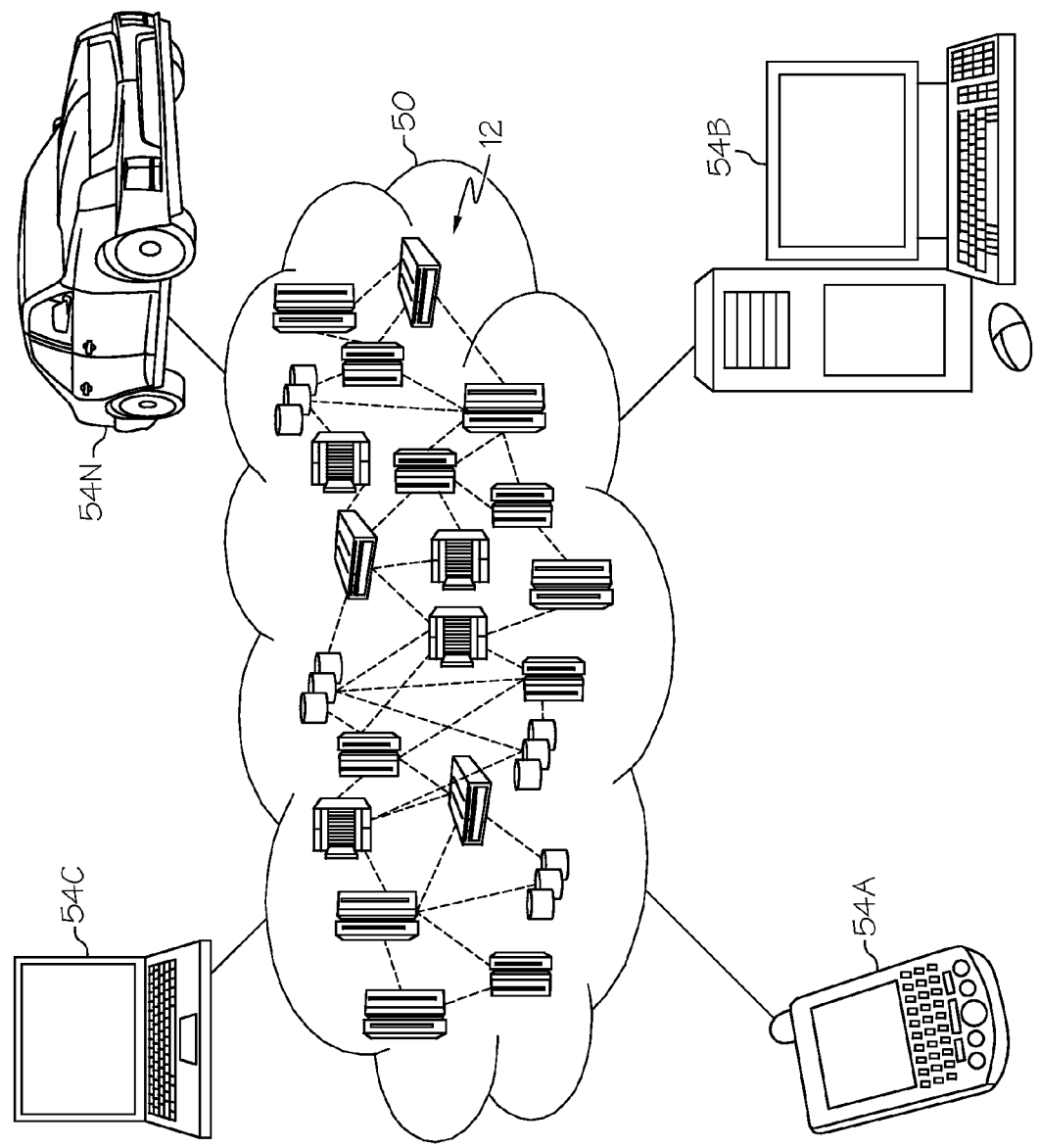
FIG. 2 depicts a Cloud computing environment according to an embodiment of the present invention.

Referring now to FIG. 2, illustrative Cloud computing environment 50 is depicted. As shown, Cloud computing environment 50 comprises one or more Cloud computing nodes 10 with which computing devices such as, for example, personal digital assistant (PDA) or cellular telephone 54A, desktop computer 54B, laptop computer 54C, and/or automobile computer system 54N communicate. This allows for infrastructure, platforms, and/or software to be offered as services (as described above in Section I) from Cloud computing environment 50, so that each client does not have to separately maintain such resources. It is understood that the types of computing devices 54A-N shown in FIG. 2 are intended to be illustrative only and that Cloud computing environment 50 can communicate with any type of computerized device over any type of network and/or network/addressable connection (e.g., using a web browser).

Figure 3:
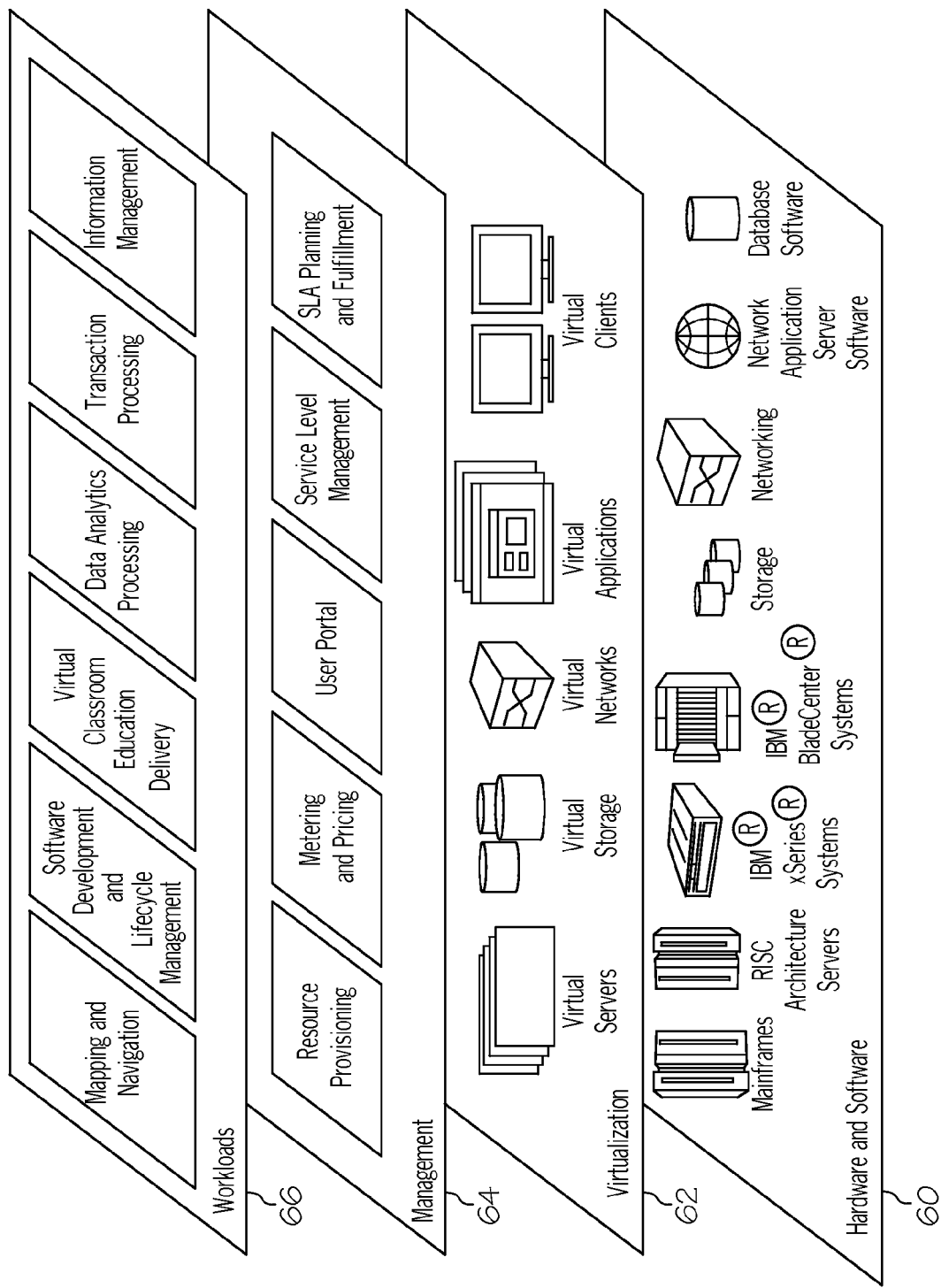
FIG. 3 depicts Cloud abstraction model layers according to an embodiment of the present invention.

Referring now to FIG. 3, a set of functional abstraction layers provided by Cloud computing environment 50 (FIG. 2) is shown. It should be understood in advance that the components, layers, and functions shown in FIG. 3 are intended to be illustrative only, and the invention is not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems; IBM xSeries® systems; IBM BladeCenter® systems; storage devices; networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation in the United States, other countries, or both.)

Virtualization layer 62 provides an abstraction layer from which the following exemplary virtual entities may be provided: virtual servers; virtual storage; virtual networks, including virtual private networks; virtual operating system(s), virtual applications; and virtual clients.

Management layer 64 provides the exemplary functions described below. Resource provisioning provides dynamic procurement of computing resources and other resources that are utilized to perform tasks within the Cloud computing environment. Metering and pricing provide cost tracking as resources are utilized within the Cloud computing environment, and billing or invoicing for consumption of these resources. In one example, these resources may comprise application software licenses. Security provides identity verification for consumers/users and tasks, as well as protection for data and other resources. User portal provides access to the Cloud computing environment for both users and system administrators. Service level management provides Cloud computing resource allocation and management such that required service levels are met. Service Level Agreement (SLA) planning and fulfillment provides pre-arrangement for, and procurement of, Cloud computing resources for which a future requirement is anticipated in accordance with an SLA.

Workloads layer 66 provides functionality for which the Cloud computing environment is utilized. Examples of workloads and functions which may be provided from this layer include: mapping and navigation; software development and lifecycle management; virtual classroom education delivery; data analytics processing; transaction processing; and information management. As mentioned above, all of the foregoing examples described with respect to FIG. 3 are illustrative only, and the invention is not limited to these examples.

It is understood all functions of the present invention as described herein are typically performed by information management function, which can be tangibly embodied as modules of program code 42 of program/utility 40 (FIG. 1).

Figure 4:
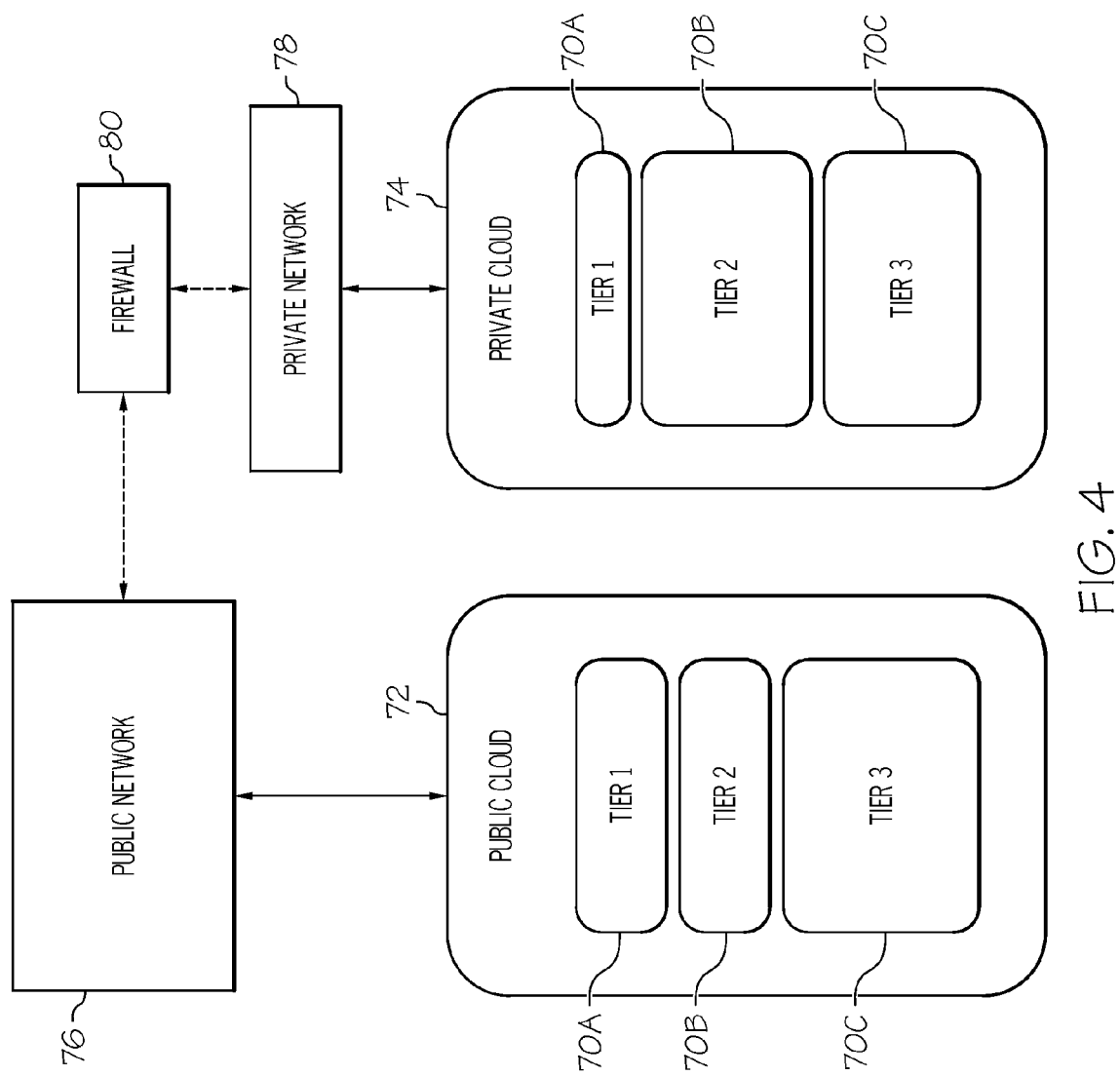
FIG. 4 depicts a set of storage tiers according to an embodiment of the present invention.

Referring now to FIG. 4, illustrative tiers 70A-C of public Cloud 72 and private Cloud 74, as implemented using public network 76, private 78, and firewall 80. In general, embodiments of the present invention allow for data to be migrated/moved between tiers 70A-B based upon a measured value thereof. For example, if a set of data stored in tier 70A becomes less valuable, it can be moved to tier 70B or tier 70C. If the value later increases, the set of data can be moved to a higher tier. This process is typically guided by a set of policies that allows for tier configurations to be defined and for factors to be set to determine value of a data set. Such factors include a last access time, age of utilization, an input/output rate of the data, a cache percentage, data rate and a response time of the data. In one example, tier 70A could be solid state memory or Flash memory, tier 70B could be a hard disk drive or SATA memory, and tier 70C could be a tape drive or the like. Along these lines, it is understood that higher tiers such as 70A are typically faster and more expensive relative to lower tiers such as 70B or 70C. Although FIG. 4 shows a particular number of tiers, it should be understood that any quantity of storage tiers can be implemented.

Figure 5:
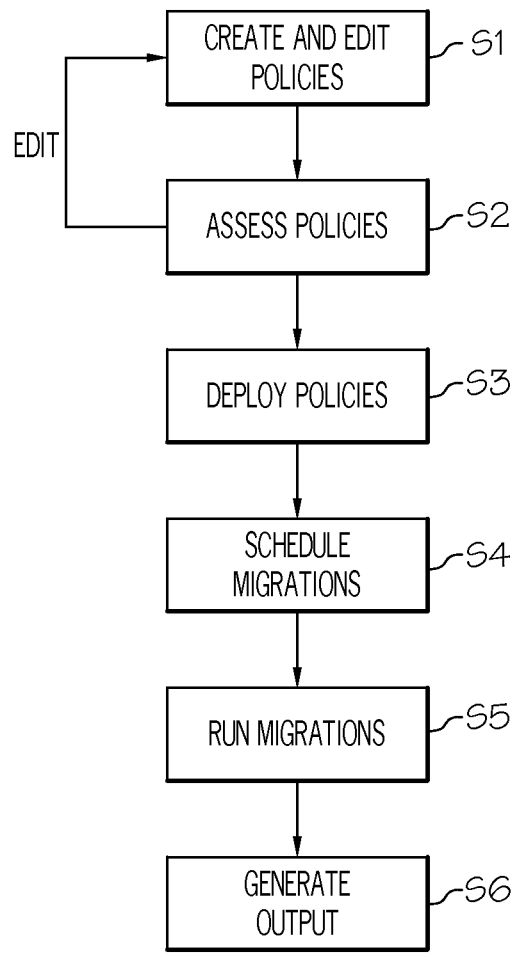
FIG. 5 depicts a method flow diagram according to an embodiment of the present invention.

Regardless, this process will be further explained in accordance with the flow diagram of FIG. 5. In step S1, a set (one or more) of policies are created and edited. In general, the set of policies automate data valuation and migration. Typically, the set of policies model the value of data along different dimensions (e.g. last access time, I/O rate, etc). As opposed to quantifying the value of data with a single number, policies respect how changes in different dimensions may affect the data's importance in different ways. In step S2, each policy is assessed to determine effects of their deployment (e.g., will policy implementation cause a particular tie to become overloaded and slow). Along these lines, visual summaries could be produced that provide potential scenario information that could be generated as part of step S2. The summaries are a referred to herein as a set of "policy" recommendations that predict the value of the data and offer an improved migration strategy for moving the data between the set of storage tiers over time as the value of the data changes.

Figure 6:
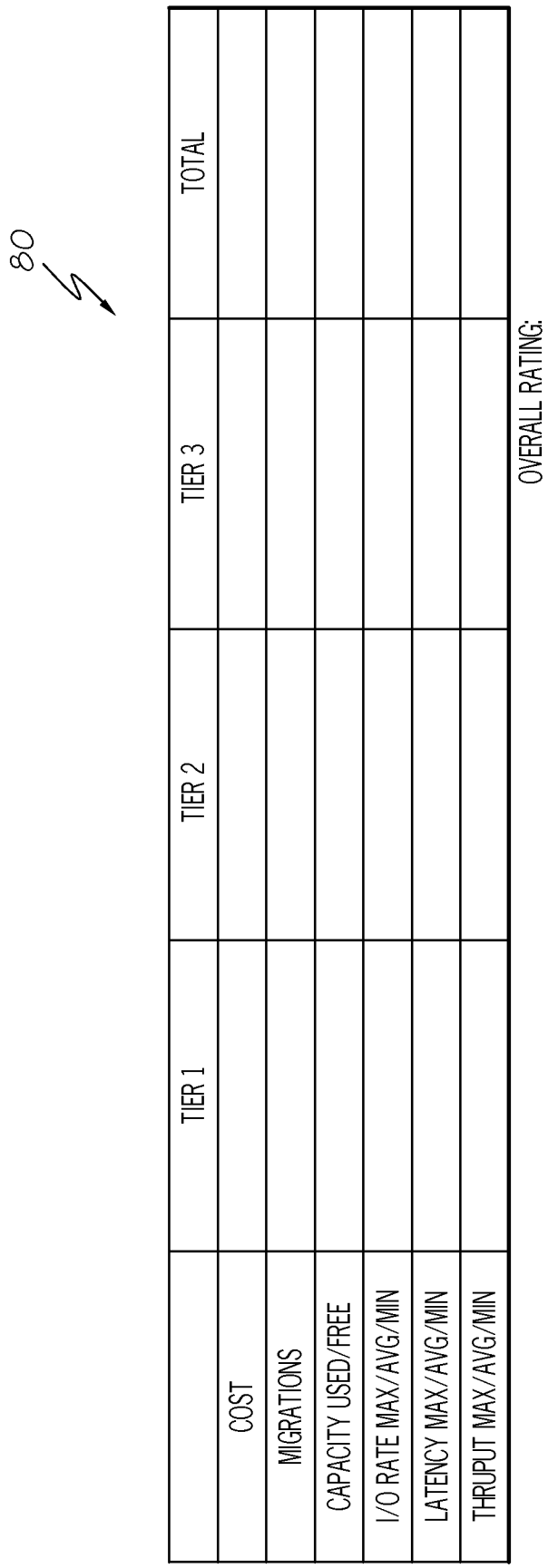
FIG. 6 depicts an illustrative summary table predicting implementation of policies according to an embodiment of the present invention.

An example summary is shown in FIG. 6. As depicted, visualization 80 can comprise a table or the like for the tiers and characteristics thereof. Such characteristics include cost, migrations, capacity of the tier, I/O rate, latency, and throughput. This will allow an administrator or the like to see specific information with respect to each tier should a policy be carried out.

Figure 7:
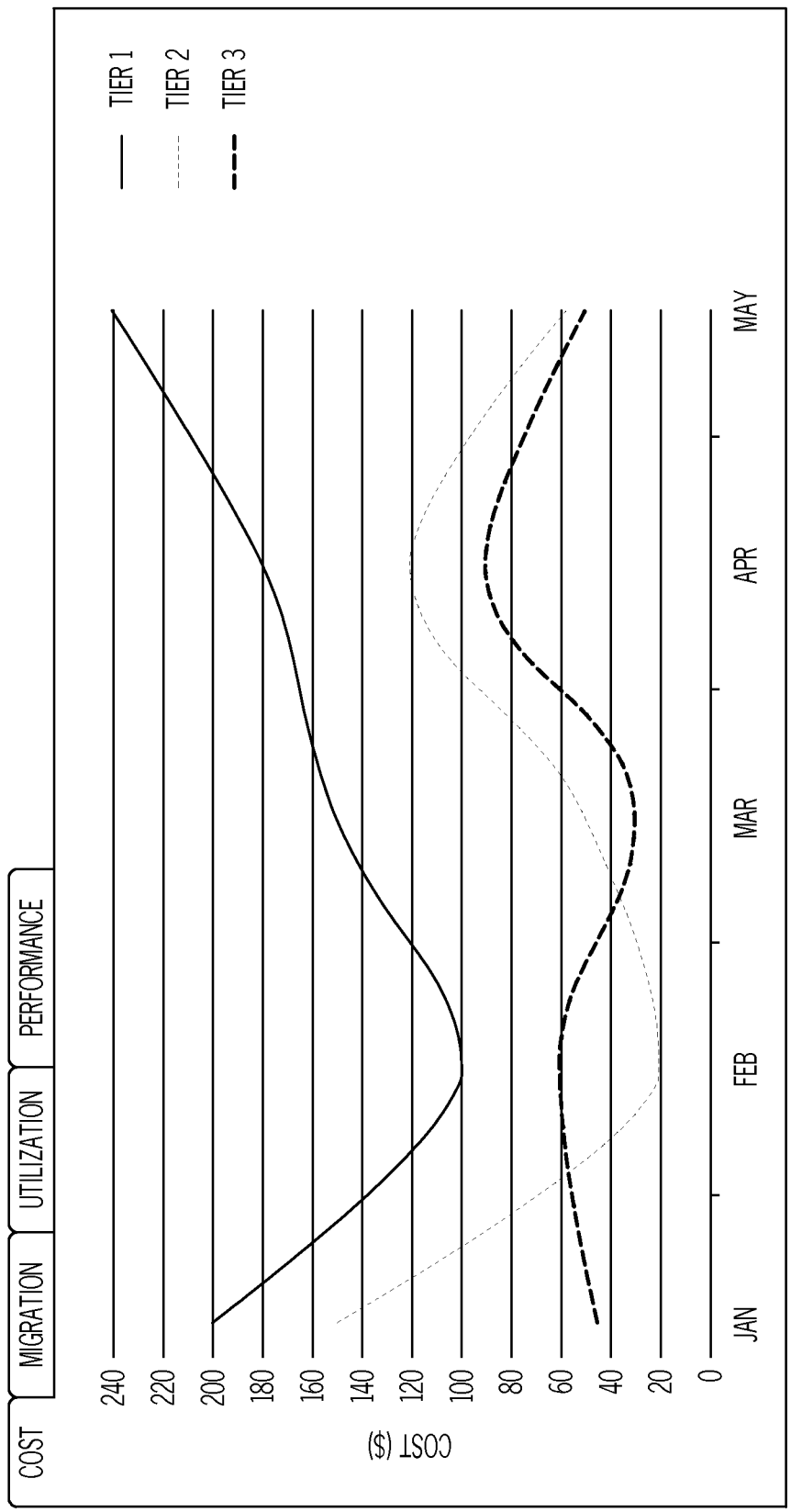
FIG. 7 shows a first illustrative visual output according to an embodiment of the present invention.
Figure 8:
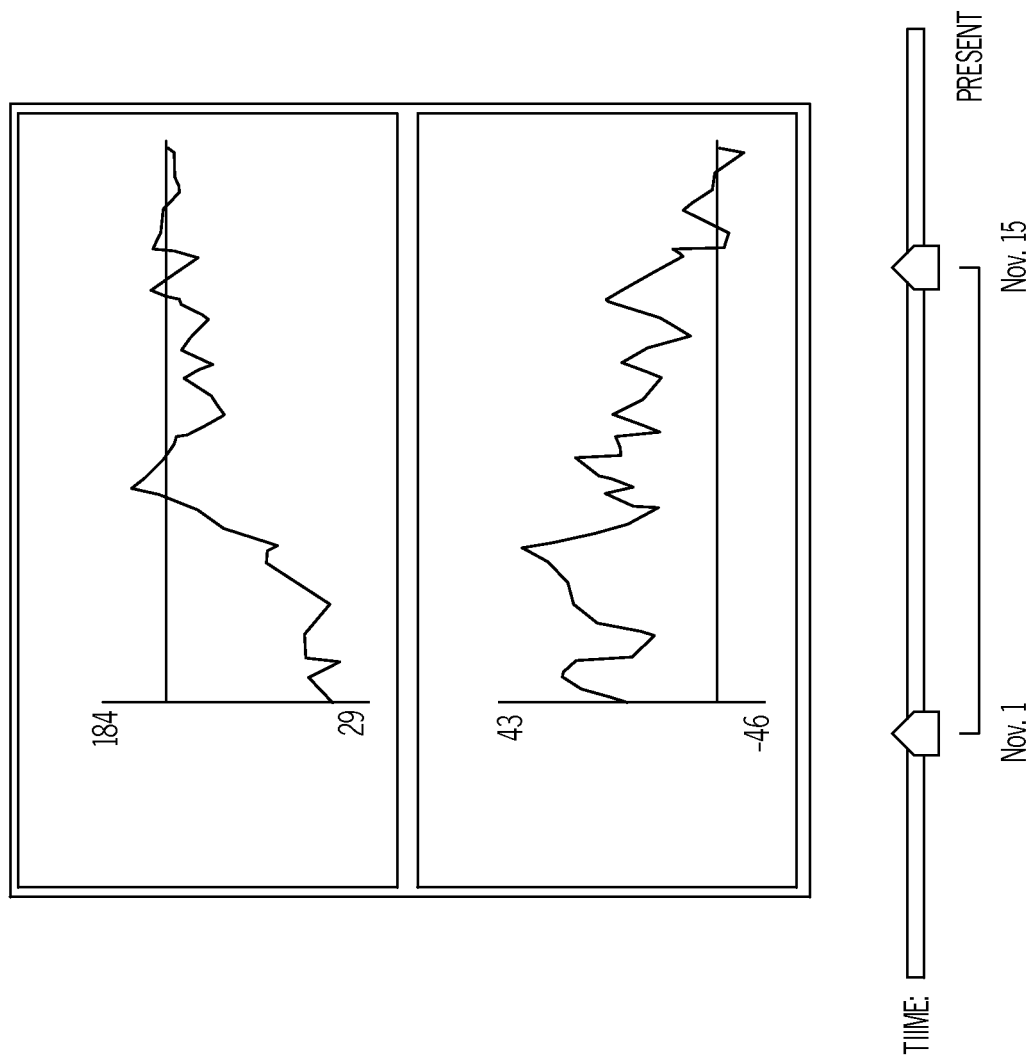
FIG. 8 shows a first illustrative visual output according to an embodiment of the present invention.

Referring to FIG. 5, in step S3, the set of policies are deployed. In step S4, migrations of data among tiers (based on changing data values) are scheduled according to the set of policies. Then, in step S5, the policies are implemented (e.g., migrations are run). In step S6, output or visualizations can be generated to inform administrators how the policy implementations are progressing (e.g., how the migrations are running). Examples of visualizations are shown in FIGS. 7 and 8. Referring first to FIG. 7, a visualization of costs over time for each tier can be seen. In this example, February appears to be the month with the lowest storage costs for tier 1 and tier 3, while March is for tier 3. Conversely, April is the month with the highest storage cost for tiers 2 and 3, while May is for tier 1. FIG. 8 shows performance measurements along two different dimensions (e.g., I/O rate & data rate) for data over a selected period of time.

While shown and described herein as an information management solution, it is understood that the invention further provides various alternative embodiments. For example, in one embodiment, the invention provides a computer-readable/useable medium that includes computer program code to enable a computer infrastructure to provide an information management solution functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1)

and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide an information management solution. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for providing information management solution functionality. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for managing data storage within a Cloud computing environment, comprising:
   accessing a set of policies for managing storage of data, the set of policies automating valuation of the data and migration of the data between a set of storage tiers of a particular cloud within the Cloud computing environment;
   assessing the set of policies to determine effects of implementing the set of policies;
   implementing the set of policies;
   providing a set of recommendations based on the implementation of the set of policies, the set of recommendations comprising a visual summary depicting a prediction of a value of the data, as well as generating a migration strategy for dynamically moving the data between the set of storage tiers of the particular cloud over time as the prediction of the value of the data changes, the visual summary comprising at least one characteristic including cost, migrations, storage capacity, input/output (I/O) rate, latency, and throughput for at least one storage tier of the set of storage tiers; and
   generating output based on the set of recommendations.

2. The method of claim 1, the set of policies modelling the value of data according to a plurality of factors.

3. The method of claim 2, the plurality of factors comprising a last access time, age of utilization, an input/output rate of the data, a cache percentage, data rate and a response time of the data.

4. The method of claim 1, the output depicting savings over time by migrating the data between the set of tiers.

5. The method of claim 1, further comprising defining a configuration for the set of tiers.

6. The method of claim 1, the set of tiers each having a different cost for storing the data.

7. A system for managing data storage within a Cloud computing environment, comprising:
   a bus;
   a processor coupled to the bus; and
   a memory medium coupled to the bus, the memory medium comprising instructions to:
      access a set of policies for managing storage of data, the set of policies automating valuation of the data and migration of the data between a set of storage tiers of a particular cloud within the Cloud computing environment;
      assess the set of policies to determine effects of implementing the set of policies;
      implement the set of policies;
      provide a set of recommendations based on the implementation of the set of policies, the set of recommendations comprising a visual summary depicting a prediction of a value of the data as well as generating a migration strategy for dynamically moving the data between the set of storage tiers of the particular cloud over time as the prediction of the value of the data changes, the visual summary comprising at least one characteristic including cost, migrations, storage capacity, input/output (I/O) rate, latency, and throughput for at least one storage tier of the set of storage tiers; and
      generate output based on the set of recommendations.

8. The system of claim 7, the set of policies modelling the value of data along a plurality of factors.

9. The system of claim 8, the plurality of factors comprising a last access time, age of utilization, an input/output rate of the data, a cache percentage, data rate and a response time of the data.

10. The system of claim 7, the output depicting savings over time by migrating the data between the set of storage tiers.

11. The system of claim 7, the memory medium further comprising instructions to define a configuration for the set of storage tiers.

12. The system of claim 7, the set of storage tiers each having a different cost for storing the data.

13. A computer program product on a computer readable storage device for managing data storage within a Cloud computing environment and program instructions stored on the computer readable storage device, to:
   access a set of policies for managing storage of data, the set of policies automating valuation of the data and migration of the data between a set of storage tiers of a particular cloud within the Cloud computing environment;
   assess the set of policies to determine effects of implementing the set of policies;
   implement the set of policies;
   provide a set of recommendations based on the implementation of the set of policies, the set of recommendations comprising a visual summary depicting a prediction of a value of the data as well as generating a migration strategy for dynamically moving the data between the set of storage tiers of the particular cloud over time as the prediction of the value of the data changes, the visual summary comprising at least one characteristic including cost, migrations, storage capacity, input/output (I/O) rate, latency, and throughput for at least one storage tier of the set of storage tiers; and
   generate output based on the set of recommendations.

14. The computer program product of claim 13, the set of policies modelling the value of data along a plurality of factors.

15. The computer program product of claim 14, the plurality of factors comprising a last access time, age of utilization, an input/output rate of the data, a cache percentage, data rate and a response time of the data.

16. The computer program product of claim 13, the output depicting savings over time by migrating the data between the set of storage tiers.

17. The computer program product of claim 13, further comprising program instructions stored on the computer readable storage device to:
   define a configuration for the set of storage tiers.

18. The computer program product of claim 13, the set of storage tiers each having a different cost for storing the data.

19. A method for deploying a system for managing data storage within a Cloud computing environment, comprising:
   providing a computer infrastructure having functionality to:
   access a set of policies for managing storage of data, the set of policies automating valuation of the data and migration of the data between a set of storage tiers of a particular cloud within the Cloud computing environment;
   assess the set of policies to determine effects of implementing the set of policies;
   implement the set of policies;
   provide a set of recommendations based on implementation of the set of policies, the set of recommendations comprising a visual summary depicting a prediction of a value of the data as well as generating a migration strategy for dynamically moving the data between the set of storage tiers of the particular cloud over time as the prediction of the value of the data changes, the visual summary comprising at least one characteristic including cost, migrations, storage capacity, input/output (I/O) rate, latency, and throughput for at least one storage tier of the set of storage tiers; and
   generate output based on the set of recommendations.

* * * * *

UNITED STATES PATENT AND TRADEMARK OFFICE
CERTIFICATE OF CORRECTION

| | | |
|---|---|---|
| PATENT NO. | : 8,918,439 B2 | Page 1 of 1 |
| APPLICATION NO. | : 12/817245 | |
| DATED | : December 23, 2014 | |
| INVENTOR(S) | : Alatorre et al. | |

It is certified that error appears in the above-identified patent and that said Letters Patent is hereby corrected as shown below:

On the Title Page:

Item (75) Inventors: Delete "Richard Ayala" and insert -- Richard Ayala, Jr. --.

Signed and Sealed this
Third Day of May, 2016

Michelle K. Lee
*Director of the United States Patent and Trademark Office*